United States Patent Office 2,744,146
Patented May 1, 1956

2,744,146

PRODUCTION OF BENZENE HEXACHLORIDE

Frederick C. Dehn, New Martinsville, W. Va., assignor to Columbia-Southern Chemical Corporation, Allegheny County, Pa., a corporation of Delaware No Drawing. Application May 22, 1952,
Serial No. 289,433

8 Claims. (Cl. 260—648)

This invention relates to a novel method of producing benzene hexachloride by addition chlorination of benzene, and it has particular relation to addition chlorination of benzene at increased chlorination rates.

It is known that benzene hexachloride may be prepared by reaction of benzene and chlorine in the absence of a chlorination substitution catalyst, such as ferric or aluminum chloride. This reaction is facilitated by resort to catalysts, such as actinic light. Actinic light is that light, usually about 2500 to 4500 A. in wave length, which produces chemical change.

Several methods of preparing benzene hexachloride are described in the literature. According to one such method, chlorine gas is reacted with an excess of benzene at or near room temperature while irradiating the reaction mixture with actinic light. According to a further method, benzene and liquid chlorine may be reacted at a temperature and/or pressure to maintain the chlorine in the liquid state. The temperatures which have been used in the latter method have usually been from 0° C. to minus 33.7° C. Actinic light is used to promote the reaction although the reaction using liquid chlorine is reported to proceed even in the dark.

In the former method, chlorine gas is usually added to a pool of liquid benzene while irradiating the reaction pool with actinic light. Under conventional operating conditions, this reaction requires at least about 2 hours, and normally 4 or more hours, to react a substantial portion of the benzene, for example, 15 per cent or more by weight of the original benzene charge.

The second process is generally carried out by adding liquid benzene to refluxing liquid chlorine while irradiating the reacting mass with actinic light. In one technique, benzene is added slowly, such as dropwise, to refluxing liquid chlorine over a period of several hours, i. e., 3 to 5 hours. In another embodiment, benzene is added to chlorine in a matter of minutes, but the reaction is irradiated with actinic light of relatively low intensity for a period of several hours, such as 4 hours.

According to this invention, rapid chlorination of benzene to produce substantial amounts of benzene hexachloride may be achieved by reacting chlorine and benzene in the presence of an aqueous solution of a water soluble salt of acetic acid, such as water solution of potassium acetate. The addition chlorination proceeds at an unusually rapid rate, with at least about 40 per cent by weight of available benzene capable of being converted to benzene hexachloride in several minutes, for example, 15 minutes. The acetate solution promotes the reaction. Thus, the reaction is not dependent on the use of other well known catalysts for satisfactory results. For example, it may be carried out in the dark, that is, in the absence of actinic radiation.

The invention may be practiced with recourse to different procedures. For example, the reaction between chlorine and benzene may be conducted by introducing gaseous or liquid chlorine into a reaction zone containing benzene and an aqueous solution of a salt of acetic acid while maintaining the temperature within the reaction zone such that the reaction mixture remains in the liquid phase and not above about 80° C. Temperatures substantially below 0° C., such as minus 30° C. or even lower, may be employed under certain circumstances. Preferably, the reaction is carried out within a range of 0° to 40° C., with temperatures of 15° to 30° C. providing optimum results. The temperature may be held constant or permitted to rise within a given range, such as from 0° to 40° C.

In general, the reaction should be carried out with the reaction mixture substantially in a liquid state. Thus, when temperatures below about 5° C. are employed, it is advisable to insure that the benzene and aqueous solution do not solidify. Various procedures may be employed to maintain the mixture in a liquid condition. Salts such as NaCl, KCl, CaCl$_2$ or the like, may be added to the reaction mixture to depress the freezing point. Benzene solvents which form low melting point eutectics with benzene, such as carbon tetrachloride, dichlorodifluoromethane and the like, may be incorporated in the reaction mixture. Other solvents, as will hereinafter be described, which also impart other benefits to the process may be used to provide low melting point eutectics.

According to another embodiment, this invention may be practiced under special conditions which particularly favor enhanced gamma isomer contents. Accordingly, gamma isomer contents of from above 15 per cent to in excess of 19 per cent by weight of the benzene hexachloride product may be achieved by employing a selected benzene solvent in the reaction mixture. The solvents which favor enhanced gamma isomer production are partially halogenated liquid aliphatic hydrocarbons containing 1 to 4 carbon atoms, such as methylene dichloride, methyl chloride, chloroform, ethylene dichloride, methyl chloroform, and the like. In general, especially good results may be obtained by using partially chlorinated aliphatic hydrocarbons containing 1 or 2 carbon atoms. However, other compounds, such as trichloroethane, tertiary butyl chloride, secondary butyl chloride, isopropyl chloride, isobutyl chloride, n-propyl chloride, 1,1,2,2,3 - pentachloropropane, higher butane halides, etc. containing up to (and including) 4 carbon atoms, and analogous bromides, iodides or fluorides, may be employed.

The exact nature of the effect of these compounds is not known, but they have a particular effect which they impart to the reaction which is conducive to the formation of high concentrations of gamma isomer. They do not only function as solvents for the benzene in the organic phase of the reaction. The difference due to this unaccountable effect is emphasized by the fact that fully halogenated aliphatic hydrocarbons, such as carbon tetrachloride and dichlorodifluoromethane, are not conducive to the production of benzene hexachloride containing gamma isomer contents of from 15 to 19 percent, or higher, when employed in lieu of these partially halogenated aliphatic hydrocarbon solvents under identical reaction conditions in accordance with this invention.

The amount of partially halogenated hydrocarbon which is employed with benzene may be varied from 5 to 99 per cent by weight of benzene and partially halogenated hydrocarbon. In general, best results are attained when higher concentrations of the partially halogenated hydrocarbon are used, for example, when 30 to 95 per cent by weight of the organic phase of the reaction mixture are employed.

Temperature control within the reaction zone may be effected by use of various cooling techniques. The reaction zone may be externally cooled by circulating coolants, such as a Dry Ice-acetone mixture or brine, in a jacket surrounding the zone. Alternatively, refrigerating coils may be disposed within the zone. When temperatures above 0° C. are employed, crushed ice may be incorporated in the reaction mixture. The latter expedient may be employed when rising temperatures within a controlled range are employed, in contrast to isothermal conditions which require continuous removal of heat from the reaction zone during the reaction.

While the reaction is most conveniently effected under atmospheric pressures, it is operable under superatmospheric pressures or subatmospheric pressures with certain modifications in the design of the apparatus. For instance, at subatmospheric pressures, additional precautions must be taken to avoid loss of the more volatile components of the reaction mixture, such as solvents, when they are employed in the chlorine stream as it leaves the reaction zone.

For maximum benefits, to accrue, the organic and aqueous phases should be well interdispersed. Thus, the mixture should be vigorously agitated. However, with mild agitation or even in the absence of intentional agitation, the reaction will proceed favorably.

Any water soluble salt of acetic acid may be employed in the aqueous phase of the reaction mixture. Potassium, sodium, magnesium, lithium, uranyl and barium acetates and the like are all suitable and may be employed individually or in various combinations with one another. In general, potassium and sodium acetate appear to favor highest gamma isomer contents in the final product.

The proportion of aqueous phase to organic phase in the reaction mixture may be varied over a considerable range, so long as enough water is available to maintain the acetate salt in solution and also provide a reaction mixture with sufficient fluidity. The concentration of the acetate may also be varied widely, with aqueous phases of the reaction mixture containing from less than 1 per cent to 30 per cent of the acetate or even higher, by weight of the aqueous phase, being suitable. In general, the concentration of the alkali has relatively small, if any, bearing on the gamma isomer content of the product or the benzene conversion rate. However, the more dilute the acetate solution is, the greater the efficiency of the reaction, i. e., the less chlorine that passes through the reaction mixture unreacted. Thus, best results are generally obtained when the aqueous phase contains about from ½ to 5 per cent by weight of the acetate.

While the strength of the acetate solution forming the aqueous phase of the reaction mixture as indicated above may be varied considerably, it is governed to some extent by the fact that a certain amount of acetate must be present for a given amount of chlorine to react. In general, from about 8 to 25 grams of chlorine react per gram of acetate present in the reaction mixture. Thus, unduly dilute aqueous solutions would necessitate a large aqueous phase.

From experimental tests, there appears to be no theoretical limitation on the rate at which chlorine may be added to a given reaction mixture. For instance, the chlorine rate has been varied from 6.45 to 22.5 grams per minute per 100 grams of benzene in the reaction mixture without any significant change in the product or yield. For practical reasons, the chlorine rate should be regulated such that it does not blow through the reaction mass and out of the system and cause too great a sweeping of solvent or other volatile constituent of the reaction mass out of the reaction zone.

Similarly, the degree of benzene conversion does not produce any significant changes in gamma isomer content. The reaction may be carried out until essentially all of the benzene has been reacted. Practical considerations, however, usually make it more suitable to stop the reaction at some point before all the available benzene has been converted to benzene hexachloride; the exact point at which chlorination is stopped being determined by balancing the various factors involved. One such consideration involves the clogging of the chlorine feed line when highly concentrated slurries of benzene hexachloride are in the reaction zone. After about 15 or 18 per cent of the benzene has been converted, solid benzene hexachloride appears in the reaction mixture and, as further chlorination occurs, solids form at or within the chlorine feed line. The problem of providing the highly desirable agitation as the fluidity of the reaction mass increases due to the formation of solid benzene hexachloride is compounded.

Although the invention is generally practiced in the absence of catalysts other than acetate solutions, other catalysts may be used in combination with the acetates. Thus the reaction mixture of the invention may be irradiated with actinic light, or with gamma irradiation or other high frequency electromagnetic radiation. Organic peroxides, such as benzoyl peroxide, and peroxydicarbonate esters such as isopropyl peroxydicarbonate may also be used in conjunction with the acetate solution to catalyze the reaction. Any and all combinations of these catalysts may be employed with the acetate solution.

EXAMPLE I

The apparatus employed was a 500 milliliter, 3 necked pyrex glass flask. The center neck was fitted with a stirrer bushing through which a half moon type ground glass stirring rod was inserted into the flask. Drive for the stirring rod was provided by a 115 volt variable speed stirrer motor attached to the portion of the rod outside the flask. One side neck was equipped with a chlorine inlet tube extending far enough into the flask so as to be beneath the surface of the reaction mixture when the flask is charged therewith. A thermometer was inserted into the flask through the chlorine inlet tube. The other side neck was equipped with a chlorine outlet tube which led to a short water cooled condenser and then to scrubbers for cleaning the exit gases.

The entire flask and all the fittings were completely covered with black friction tape to exclude all light, except for a small section of the chlorine inlet tube which was left uncovered to permit reading of the thermometer.

The general procedure included charging the flask with preselected amounts of benzene, solvent and the aqueous acetate solution. In some runs, crushed ice was charged with the reactants to the flask. In others, water was used in lieu of ice.

When crushed ice was employed, the flask was externally cooled by immersing the flask in an acetone-Dry Ice mixture to prevent melting of the crushed ice. Meanwhile the system including the reaction mass was purged with nitrogen for 30 minutes at the rate of 7.18 moles per hour. If water replaced the crushed ice, the reaction mixture was initially cooled to the reaction temperature and then purged.

After the 30 minute purge, chlorine was introduced from a small cylinder through several traps and the chlorine inlet tube into the reaction mixture. If isothermal reaction temperatures were employed cooling was continued by keeping the reaction flask immersed in the Dry Ice-acetone bath. With crushed ice, the cooling bath was removed immediately prior to the start of the chlorine feed; the reaction proceeded without temperature control other than that afforded by the ice.

The specific amounts of reactants charged to the flask, exact temperature conditions, chlorine feed rates, reaction time, etc., were varied in accordance with the values set forth in the hereinafter tabulated data.

Upon completion of the reaction, the product was filtered through a Buchner funnel to recover the solid benzene hexachloride. The two remaining layers were separated, and the benzene and solvent were removed from the organic layer by distillation to recover the benzene hexachloride therein. Both products were combined, crushed to a powder, washed with water and analyzed for isomer distribution. The results and reaction conditions are tabulated in the following table:

bath. When such temperatures are attained, gaseous or liquid chlorine, is added to the reaction mixture until

*Table 1*

| Benzene, Moles | H₂O, Moles | Caustic | | Chlorine, Moles | Time of Cl₂ Addition Minutes | Percent Chlorine Converted | Reaction Temperature ° C. | Percent Solvent [2] | Isomer Content, percent | | | | |
|---|---|---|---|---|---|---|---|---|---|---|---|---|---|
| | | Type | Moles | | | | | | alpha | beta | gamma | delta | epsilon |
| 0.675 | 11.11 | NaOAc.3H₂O | 0.0625 | 0.623 | 13 | 52.1 | 0 to +36 | 80% CH₂Cl₂ | 61.1 | ------ | 18.3 | 9.4 | 2.5 |
| 0.675 | [1] 11.11 | NaOAc.3H₂O | 0.0625 | 0.830 | 15 | 82.1 | 0 to +35 | 80% CH₂Cl₂ | 59.4 | ------ | 18.1 | 11.5 | 2.4 |
| 0.675 | [1] 11.11 | MgO(Ac)₂.4H₂O | 0.0625 | 0.975 | 15 | 73.6 | −2 to +39 | 80% CH₂Cl₂ | 58.0 | ------ | 17.7 | 11.1 | 2.6 |
| 0.675 | [1] 11.11 | UO₂(Ac)₂.2H₂O | 0.0625 | 0.975 | 15 | 31.9 | 0 to +12 | 80% CH₂Cl₂ | 46.3 | ------ | 15.9 | 12.9 | 6.5 |
| 0.675 | [1] 11.11 | NaOAc.3H₂O | 0.0625 | 0.830 | 15 | 80.5 | −4 to +38 | 80% CH₂Cl₂ | 58.4 | ------ | 18.1 | 9.2 | 2.4 |
| 0.675 | [1] 11.11 | NaOAc.3H₂O | 0.0625 | 0.936 | 15 | 60.8 | −2 to +30 | 80% CH₂Cl₂ | 56.2 | 10.2 | 18.2 | 11.2 | 1.6 |
| 0.675 | [1] 11.11 | NaOAc.3H₂O | 0.0625 | 0.515 | 15 | 76.4 | 0 to +8 | 80% CH₃—CCl₄ | 53.1 | 12.5 | 17.0 | 11.7 | 3.5 |
| 0.248 | [1] 11.11 | NaOAc.3H₂O | 0.0625 | 0.980 | 15 | 85.6 | −2 to +43 | 50% CH₂Cl₂ | 61.1 | 8.9 | 17.1 | 8.3 | 1.5 |
| 0.675 | [1] 11.11 | NaOAc.3H₂O | 0.0625 | 0.986 | 15 | 72.5 | −4 to +54 | 25% CH₂Cl₂ | 59.9 | 12.3 | 15.3 | 8.7 | 1.3 |
| 0.675 | [1] 11.11 | LiOAc.2H₂O | 0.0625 | 0.895 | 15 | 81.4 | −2 to +39 | 80% CH₂Cl₂ | 60.7 | 8.3 | 17.5 | 10.0 | 1.5 |
| 0.675 | [1] 11.11 | KOAc | 0.0625 | 0.934 | 15 | 77.5 | −4 to +39 | 80% CH₂Cl₂ | 60.8 | 8.3 | 19.2 | 9.4 | 1.0 |
| 0.675 | [1] 11.11 | CaO(Ac)₂.H₂O | 0.1250 | 1.021 | 15 | 73.5 | −4 to +40 | 80% CH₂Cl₂ | 60.1 | 7.8 | 17.1 | 10.1 | 2.1 |
| 0.675 | [1] 11.11 | KOAc | 0.1250 | 0.896 | 15 | 69.6 | −4 to +40 | 80% CH₂Cl₂ | 60.8 | 7.4 | 17.1 | 8.8 | 2.1 |
| 0.257 | [1] 11.11 | KOAc | 0.0625 | 0.941 | 15 | 71.2 | −40 to +7 | 92% CH₂Cl₂ | 51.1 | 10.7 | 16.8 | 13.1 | 2.6 |
| 0.675 | [1] 11.11 | KOAc | 0.0625 | 0.890 | 15 | 71.9 | −4 to +38 | 80% CH₂Cl₂ | 59.1 | 8.9 | 18.6 | 9.8 | 1.3 |
| 0.675 | [1] 11.11 | KOAc | 0.0625 | 0.914 | 15 | 75.1 | −4 to +39 | 80% CH₂Cl₂ | 59.1 | 9.7 | 18.9 | 7.0 | 1.5 |
| 0.675 | 11.11 | KOAc.3H₂O | 0.0625 | 1.036 | 7.5 | 96.5 | +5 | 80% CH₂Cl₂ | 57.7 | 9.5 | 17.5 | 10.1 | 1.3 |
| 0.675 | 11.11 | KOAc.3H₂O | 0.0625 | 1.425 | 15 | 83.1 | +5 | 80% CH₂Cl₂ | 56.8 | 10.1 | 18.4 | 10.3 | 1.3 |
| 0.675 | 11.11 | KOAc.3H₂O | 0.0625 | 1.90 | 15 | 80.3 | +5 | 80% CH₂Cl₂ | 60.3 | 9.8 | 17.3 | 10.4 | 1.0 |
| 0.675 | 5.55 | KOAc.3H₂O | 0.0625 | 0.855 | 7.5 | 69.3 | +5 | 80% CH₂Cl₂ | 55.5 | 10.6 | 18.7 | 7.7 | 2.1 |
| 0.675 | 11.11 | KOAc.3H₂O | 0.0625 | 0.903 | 7.5 | 91.7 | +5 | 80% CH₂Cl₂ | 56.8 | 10.6 | 18.1 | 9.9 | 0.8 |
| 0.675 | 8.44 | KOAc.3H₂O | 0.0625 | 0.993 | 7.5 | 80.6 | +5 | 80% CH₂Cl₂ | 54.5 | 11.6 | 16.7 | 12.2 | 1.6 |
| 0.675 | 11.11 | KOAc.3H₂O | 0.0625 | 1.106 | 7.5 | 77.2 | +15 | 80% CH₂Cl₂ | 59.8 | 7.5 | 19.0 | 9.1 | 1.3 |
| 0.675 | 11.11 | NaOAc.3H₂O | 0.0625 | 0.714 | 7.5 | 60.5 | −2 to +35 | 92% CH₂Cl₂ | 59.3 | 7.6 | 18.0 | 10.3 | 1.5 |
| 0.675 | [1] 11.11 | NaOAc.3H₂O | 0.0625 | 1.021 | 7.5 | 31.8 | −4 to +40 | 80% CH₂Cl₂ | 61.9 | 7.0 | 18.6 | 8.8 | 1.3 |
| 0.675 | [1] 11.11 | KOAc | 0.0625 | 0.737 | 7.5 | 81.0 | −4 to +40 | 80% CH₂Cl₂ | 59.7 | 8.6 | 17.6 | 8.8 | 1.3 |

[1] As crushed ice.
[2] Based on weight of benzene and solvent initially charged.

While the invention has been described with reference to batch processes, it may be conveniently practiced in continuous operations. In general, continuous processes are practiced by first establishing a desired reaction condition within the reaction zone and continuously adding reactants, in their desired proportions, to the reaction zone while continuously withdrawing an amount of the reaction mixture equivalent to the makeup being added. The solid phase in the withdrawn material is appropriately removed with the liquid phase then being separated into aqueous and organic phases. Benzene hexachloride is then recovered by conventional means from the organic phase. Unused benzene, the solvent, if employed, and the acetate, with or without recovery or purification treatments, may be recycled to the reaction zone by incorporation into the makeup stream.

Best results are achieved in continuous operations dispersing the organic and aqueous phases throughout the entire zone. This is conveniently achieved by vigorous mechanical agitation. When vigorous agitation is employed, temperature control is most conveniently provided by jacketing the reaction zone with a suitable cooling medium, such as brine or Dry Ice-acetone. Use of cooling coils within the reaction zone is possible, but complicates mechanical agitation. Addition of crushed ice also may be employed, with ice continuously added to the reaction zone. Presence of crushed ice within the reaction zone, however, also complicates agitation.

The reaction temperature is usually kept constant, preferably in the range of 15 to 30° C. Resort to lower temperatures, particularly below minus 10° C., provides slightly reduced gamma isomer contents, while temperatures in excess of 40° C. result in reductions of gamma isomer content and also requires additional precautions to prevent loss of solvents which are readily volatile at such temperatures.

Various procedures may be followed in practice of continuous operations. One such procedure involves establishing a reaction mixture of benzene, one of the aforedescribed partially halogenated liquid hydrocarbons, and an aqueous solution of a salt of acetic acid in a reaction zone, such as cylindrical glass or nickel reactor and continuously agitating the mixture vigorously during the course of the entire reaction period. The reactor and its contents are then cooled to the desired temperature, for example 20° C., by immersion in a Dry Ice-acetone bath. When such temperatures are attained, gaseous or liquid chlorine, is added to the reaction mixture until the degree of benzene conversion at which the process is to be carried out is achieved, for example when 45 per cent by weight of the benzene in the reaction zone has been converted. This establishes the equilibrium conditions which are to exist within the reaction zone during the entire operation.

A benzene-partially halogenated hydrocarbon mixture and aqueous acetate solution are then added to the reaction zone through two feed lines. The respective addition rates of these materials are correlated such that equilibrium conditions are maintained. The chlorine feed is continued. Withdrawal of the reaction mass is continuously effected via an open take off line.

The solid phases in the withdrawn mixture is then removed by filtration, centrifugation or the like. The liquid phase is separated into organic and inorganic layers, for example in a separatory funnel, and the organic layer may then be treated by conventional means to recover benzene hexachloride, such as distilling off the benzene and solvent. By recourse to proper separation techniques, benzene, solvent and the aqueous acetate solution may be recovered and recirculated to their respective feed lines for further use in the reaction zone.

The following experiment illustrates performance of the invention in a continuous process.

EXAMPLE II

The reactor was a vertically disposed Pyrex glass tube 2 inches in diameter and 12 inches long and closed at its bottom by a rubber stopper and at its top by a six-holed rubber stop. It had a capacity of approximately 500 milliliters. A stirring rod having agitating means made by flattening out and spiraling a 9 millimeter glass rod was inserted in the reaction chamber through centrally disposed hole in the stopper. Drive for the rod was furnished by a 115 volt variable speed stirrer motor. A thermometer was inserted into the reactor through another hole in said stopper. The reactor was wrapped with black friction tape to exclude all light.

Feed means and product removal means were provided constituting four 6 millimeter glass tubes inserted into the reactor through appropriate holes in the stopper. Gaseous chlorine was fed to the reactor through one such glass tube connected at one end through appropriate tubing to a chlorine cylinder and extending nearly to the bottom of the reactor at the other end. A rotameter and stopcock were included in the line of flow to measure and control the feed rate.

The benzene-solvent mixture was gravity fed from a 4 liter container into the top of reactor via another of the glass tubes. The aqueous sodium acetate solution was fed in the same manner to the reactor through still another of the tubes. Rotameters and stopcocks were provided in each feed line for control purposes.

Product removal was achieved by overflow from the reactor via the remaining glass tube which terminated in the top of the reactor. The other end of this tube led to a large glass receiver.

Several runs were made employing this apparatus. The same procedure was followed in each case. The reactor was charged with 55 grams of high quality commercial grade benzene, 220 grams of refrigeration grade methylene chloride, and 220 grams of an aqueous solution of sodium acetate containing 4.25 per cent by weight of sodium acetate.$3H_2O$. Distilled water and commercially pure sodium acetate were employed to make this solution. The reaction mixture was then cooled to 20° C. by immersion in a Dry Ice-acetone bath while agitating. This temperature was maintained during the course of the entire run by the cooling bath. Continuous agitation was provided by driving the stirrer as fast as the drive motor would permit during the entire run.

When the reaction mixture was cooled to 20° C. and after purging the system for 30 minutes with nitrogen at the rate of 7.2 moles per hour, 4.6 grams per minute of gaseous chlorine were fed into the reactor from the cylinder via its feed tube until approximately 45 per cent by weight of the benzene was converted to benzene hexachloride. This established the equilibrium condition that was maintained within the reactor for the entire reaction.

Continuous feed of the benzene-methylene chloride mixture and sodium acetate solution was then started via their respective feed systems at the rates designated in hereinafter included Table II. Chlorine feed was also continued at the rate designated therein. The product was continuously removed through the overflow tube and stored in the glass receiver.

Benzene hexachloride was recovered by separating the organic and aqueous layers in the receiver. The organic layer was topped at approximately 30 millimeters mercury pressure and 150° C., leaving molten benzene hexachloride which was flaked at room temperature on a nickel plate, and finally analyzed by infrared spectroscopy method to determine isomer distribution.

The following table summarizes the conditions and results of the above runs:

Table II

| Runs | Feed Rates, Grams per minute | | | Total Reaction Time, Minutes | Percent Chlorine Converted | Product recovered, Grams | Isomer Distribution, percent | | | | |
|---|---|---|---|---|---|---|---|---|---|---|---|
| | Benzene-Methylene Chloride | 4.25% NaOAc.$3H_2O$ | Chlorine | | | | alpha | beta | gamma | delta | epsilon |
| 1 | 16.7 | 13.3 | 4.59 | 100 | 84.8 | 530.5 | 60.9 | 7.1 | 18.9 | 9.7 | 1.3 |
| 2 | 16.7 | 13.3 | 4.23 | 103 | 80.0 | 476.0 | 61.5 | 6.1 | 18.9 | 8.8 | 1.8 |
| 3 | 28.2 | 22.5 | 7.60 | 40 | 84.3 | 349.8 | 60.2 | 6.8 | 19.6 | 9.8 | 1.3 |
| 4 | 28.2 | 22.5 | 7.82 | 48 | 72.8 | 372.2 | 61.2 | 6.8 | 19.5 | 8.5 | 0.8 |
| 5 | 16.7 | 13.3 | 4.64 | 177 | 82.1 | 919.6 | 60.9 | 6.8 | 18.8 | 8.7 | 1.0 |

EXAMPLE III

The reactor employed in this experiment was a vertically disposed, jacketed, cylindrically shaped Pyrex glass container 14 inches high and 2¾ inches in diameter. It was closed at its upper end by a six holed rubber stopper. With the exception that a stirrer consisting of a 6 millimeter glass rod having five equispaced fins made by attaching short lengths of glass rod at right angles to the main rod of the stirrer, the same apparatus as in Example II was used.

The same procedure was employed as was used in Example II. Temperature control, however, was effected by passing a Dry Ice-acetone mixture through the jacket surrounding the reaction zone. The following table shows the reaction conditions.

Table III

| Runs | Feed Rates, Grams per Minute | | | Temperature, °C. | Total Reaction Time, Minutes | Percent Chlorine Converted | Product recovered, Grams | alpha | beta | gamma | delta | epsilon |
|---|---|---|---|---|---|---|---|---|---|---|---|---|
| | Benzene-Methylene Chloride | Aqueous Sodium Acetate | Chlorine | | | | | | | | | |
| 1 | 28.2 | ¹ 22.5 | 8.2 | 20 | 49 | 56.3 | 338.5 | 60.7 | 6.4 | 17.1 | 11.5 | 2.0 |
| 2 | 33.4 | 26.6 | 8.2 | 20 | 67 | 79.6 | 588.4 | 59.3 | 7.2 | 18.6 | 14.0 | 4.7 |
| 3 | 16.5 | 26.6 | 18 | 30 | 88 | 38.3 | 824.8 | 60.0 | 9.2 | 16.7 | 9.9 | 1.8 |
| 4 | 16.5 | 26.6 | 18 | 25 | 90 | 47.1 | 1,039.5 | 61.2 | 8.1 | 16.4 | 9.8 | 1.8 |

¹ 3.065% solution by weight of KOAc.$3H_2O$ was employed.
Runs 1 and 2 were conducted using a 80-20 percent by weight mixture of methylene chloride and benzene.
In Run 2, a 3.065% solution by weight of NaOAc.$3H_2O$ was employed.
Runs 3 and 4 employed a 60-40 percent by weight mixture of methylene chloride and benzene. A 6.375% solution by weight of NaOAc.$3H_2O$ was employed in these two runs. The nitrogen purge was omitted in these runs.

Although the present invention has been described with reference to the specific details of certain embodiments thereof, it is not intended that such details shall be regarded as limitations upon the scope of the invention, except insofar as included in the accompanying claims.

I claim:

1. A method of producing benzene hexachloride by addition chlorination of benzene which comprises adding chlorine to a mixture of benzene, a partially halogenated liquid aliphatic hydrocarbon, and an aqueous solution of a water soluble metal salt of acetic acid said solution catalyzing the addition chlorination reaction.

2. The method of claim 1 wherein the halogenated hydrocarbon is a partially chlorinated hydrocarbon.

3. The method of claim 1 wherein the halogenated hydrocarbon is methylene chloride.

4. A method of producing benzene hexachloride by addition chlorination of benzene which comprises adding chlorine to a mixture of benzene and methylene chloride, in the presence of an aqueous solution of sodium acetate said solution catalyzing the addition chlorination reaction.

5. A method of producing benzene hexachloride by addition chlorination of benzene which comprises adding chlorine to a mixture of benzene and methylene chloride, in the presence of an aqueous solution of potassium acetate said solution catalyzing the addition chlorination reaction.

6. A method of producing benzene hexachloride by addition reaction of elemental chlorine and benzene which comprises catalyzing such reaction with an aqueous solution of water soluble metal salt of acetic acid.

7. The method of claim 6 wherein the salt is sodium acetate.

8. The method of claim 6 wherein the salt is potassium acetate.

References Cited in the file of this patent

UNITED STATES PATENTS

| | | |
|---|---|---|
| 2,474,590 | Morey | June 28, 1949 |
| 2,558,363 | Kolka et al. | June 26, 1951 |
| 2,691,050 | Goenee et al. | Oct. 5, 1954 |

FOREIGN PATENTS

| | | |
|---|---|---|
| 653,364 | Great Britain | May 16, 1951 |
| 656,457 | Great Britain | Aug. 22, 1951 |
| 1,000,835 | France | Oct. 17, 1951 |